United States Patent [19]

Cheng

[11] 4,400,060
[45] Aug. 23, 1983

[54] CELL ISOLATION IN BISTABLE NEMATIC LIQUID CRYSTAL CELLS

[75] Inventor: Julian Cheng, Little Silver, N.J.

[73] Assignee: Bell Telephone Laboratories, Incorporated, Murray Hill, N.J.

[21] Appl. No.: 252,148

[22] Filed: Apr. 8, 1981

[51] Int. Cl.³ .............................................. G02F 1/13
[52] U.S. Cl. ................................ 350/339 R; 350/340; 350/341
[58] Field of Search .................. 350/335, 339 R, 340, 350/341, 334

[56] References Cited

U.S. PATENT DOCUMENTS

| | | | |
|---|---|---|---|
| 3,914,020 | 10/1975 | Helfrich . | |
| 4,030,997 | 6/1977 | Miller et al. | 204/192 |
| 4,333,708 | 6/1982 | Boyd et al. | 350/334 X |

OTHER PUBLICATIONS

Cheng, J. et al., "Switching Characteristics and Threshold Properties of Electrically-Switched Nematic Liquid Crystal Bistable Configuration Devices", *1980 Biennial Display Research Conference of the Institute for Electronics and Electrical Engineers*, (Oct. 1980), pp. 180–182.

Boyd, G. D., et al., "Liquid-Crystal Orientational Bistability and Nematic Storage Effects", *Applied Physics Letters*, vol. 36, No. 7, (Apr. 1, 1980), pp. 556–558.

Thurston, R. N. et al., "Mechanically Bistable Liquid-Crystal Display Structures", *Institute of Electrical & Electronics Engineers Transactions on Electron Devices*, vol. ED-27, No. 11, (Nov. 1980), pp. 2069–2080.

Porte, G., "Surface Disclination Lines Observed in Nematic Liquid Crystals When the Surfaces Induce Homogeneously Tilted Alignment", *Le Journal de Physique*, vol. 38, No. 5, (May 1977), pp. 509–517.

Porte, G., "Tilted Alignment of MBBA Induced by Short-Chain Surfactants", *Le Journal de Physique*, vol. 37, No. 10, (Oct. 1976), pp. 1245–1252.

*Primary Examiner*—John K. Corbin
*Assistant Examiner*—Richard F. Gallivan
*Attorney, Agent, or Firm*—Michael B. Einschlag; Gregory C. Ranieri; Daniel D. Dubosky

[57] ABSTRACT

In order to prevent drift between the two stable states in the bulk of the liquid crystal material, a specific cell isolation region formed from the same liquid crystal material is required. This cell isolation is provided in one embodiment by a uniformly tilted liquid crystal alignment. The surface of the substrates between which the liquid crystal material is disposed is treated to provide the uniform tilt in regions which surround the bistable volumes of liquid crystal material.

6 Claims, 11 Drawing Figures

CELL ISOLATION IN BISTABLE NEMATIC LIQUID CRYSTAL CELLS

BACKGROUND OF THE INVENTION

The present invention pertains to the field of liquid crystal displays.

Liquid crystal molecules are elongated and a vector pointing along the elongated axis is called an orientational director. Liquid crystal displays exhibiting bistable equilibrium orientational direction configurations are useful in purely field effect storage displays, for example see an article entitled "Liquid-Crystal Orientational Bistability and Nematic Storage Effects", *Applied Physics Letters*, Vol. 36, No. 7, Apr. 1, 1980, by G. D. Boyd, Julian Cheng and P. D. T. Ngo, pp. 556-558. The orientational director configurations are bistable in the sense that the pattern of alignment in a first configuration is not altered until energy is applied to a region of the display called a cell, e.g., by an applied electric field. The applied electric field causes a first configuration to change to a second configuration, which second configuration remains substantially unaltered when the applied electric field is removed. The bistable liquid crystal configurations are produced by specific treatments of the substrate surfaces of liquid crystal displays, which treatments cause characteristic orientational director alignment thereat.

A display cell, known in FIG. 1 of the above-cited reference and called the single-tilt (ST) geometry, comprises two substrates with a liquid crystal material disposed therebetween. Each substrate surface is treated so that the liquid crystal orientational directors have a uniformly tilted boundary alignment at the substrate surfaces, which alignment is symmetrical about the midplane of the cell. The equilibrium states of the display cell are primarily horizontal or vertical in orientational director alignment in the volume of the cell and are thus differentiable optically, e.g. by the incorporation of pleochroic dyes or in many cases by the use of crossed polarizers.

A second display cell, shown in FIG. 2 of the above-cited reference and called the alternating-tilt (AT) geometry, comprises an array of ST cells with neighboring cells having oppositely tilted surface alignment. The AT geometry possesses equilibrium states and properties analogous to those of the ST geometry.

The bistable states of the liquid crystal cell are topologically inequivalent and switching therebetween in either the ST or the AT geometry requires the detachment and motion of disclinations in the cell, which motion is a transit-time limited process. (A disclination is a discontinuity in the orientation of orientational directors. The discontinuity may be located at one point or on a line.) Each state of a cell is stable only if the disclinations that define the cell boundaries are pinned to one of the cell boundaries. Otherwise, the disclinations will drift from the cell boundaries into the display cell and cause one state to switch into the other. Thus, it is necessary to provide appropriate substrate surface boundary conditions with which to surround the display cells, which substrate surface boundary conditions will pin disclinations and thereby provide stabilization of the states of the display cells. These substrate surface boundary conditions will also serve to separate display cells.

SUMMARY OF THE INVENTION

A class of liquid crystal display cell comprises a liquid crystal material, primarily in the nematic mesophase, disposed between two substrate surfaces. The substrate surfaces are treated so that the nematic orientational directors are aligned in predetermined patterns to provide stable configurations which are topologically inequivalent and have disclinations at the boundaries. It is necessary to provide a means for pinning these disclinations at the cell boundaries to ensure stability of the configurations because it is by means of movement of these disclinations that the stable configurations are switched from one to another. The present invention specifies substrate surface alignment properties which provide the pinning of disclinations at cell boundaries and at the same time provide a volume of liquid crystal material which acts as a "neutral" isolation region, i.e., a volume of liquid crystal material that does not change in orientational director configuration when the adjacent bistable cells are in either of the equilibrium states. Thus the "neutral" isolation regions which surround bistable cells provide means for separating, isolating and stabilizing bistable cells. By use of combinations of bistable cells and "neutral" isolation regions, displays are fabricated.

According to the present invention, a first substrate surface is treated so that along the boundary on that first substrate surface between a bistable liquid crystal cell volume and a "neutral" isolation region the orientational directors on the bistable side of the boundary form a space angle with respect to the orientational directors on the other side of the boundary substantially in the range of 45 degrees to 135 degrees and a second substrate surface is treated so that along the boundary on that second substrate surface between the bistable liquid crystal cell volume and the "neutral" isolation region there is substantially no discontinuity. An embodiment of the present invention can be provided by treating the substrate surfaces in the "neutral" isolation region to provide a uniformly tilted liquid crystal alignment.

BRIEF DESCRIPTION OF THE DRAWING

A complete understanding of the present invention may be gained from a consideration of the detailed description presented hereinbelow in connection with the accompanying drawing in which:

FIG. 3 shows the surface alignment discontinuities present in the AT geometry, type A or convergent type, and type B or divergent type and the resulting $S = \pm \frac{1}{2}$ bulk disclinations;

DETAILED DESCRIPTION

Figure 1:
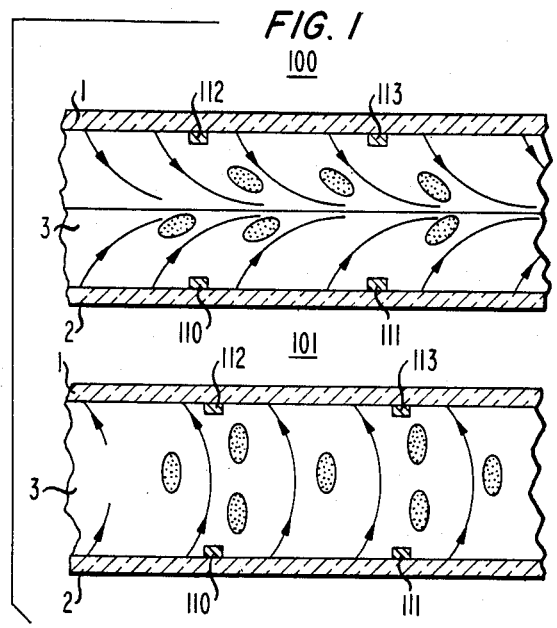
FIG. 1 shows the equilibrium states of a portion of a cell in the ST geometry, i.e. substantially horizontal state 100 and substantially vertical state 101, having interdigital electrodes (IDEs) to which a voltage is applied for switching from one equilibrium state to the other.

FIG. 1 shows the equilibrium states 100 and 101 of the single-tilt geometry (ST) of a portion of a bistable liquid crystal cell, which cell comprises substrates 1 and 2 and liquid crystal material 3, material 3 being mainly in the nematic mesophase. State 100 has a substantially horizontal configuration (H) of nematic orientational directors and state 101 has a substantially vertical configuration (V) of nematic orientational directors. Each equilibrium state is represented by a continuous configuration of arrows depicting the local nematic orientational director alignment. The cigar-shaped bodies are representations of the nematic molecules. When voltages are applied to electrodes 110–113, the electric fields generated thereby provide switching from one equilibrium state to the other.

The horizontal and vertical states are stable because of a large energy barrier between them. The barrier results from the topological inequivalence of the two states, i.e., the horizontal and vertical states (or their three-dimensional variants, the twisted configuration discussed in the Boyd et al reference) are characterized by oppositely-directed nematic orientational directors at the surface of a substrate, e.g., compare the directions of the arrows at substrate 1 in FIG. 1 for state 100 and 101. Switching requires a discontinuous change in nematic orientational direction alignment at that surface and therefore the movement of strength $\frac{1}{2}$ disclinations. These disclinations are most likely to exist at points of discontinuity in the surface topography, e.g. at the corners of elecrrodes 110–113 in FIG. 1, or at points of discontinuous change in nematic orientational director alignment at the substrate surface, e.g. see points 231–233 at substrate surface 1 for the AT geometry shown in FIG. 3. Switching from one equilibrium state to the other occurs by detaching a disclination from one point in the liquid crystal cell, relocating it to another point in the liquid crystal cell, and pinning it to the another point. Thus the stability of the equilibrium states depends upon pinning disclinations at appropriate surface discontinuities. The present invention as will be described hereinbelow, specifies the substrate surface alignment properties which provide the pinning of disclinations. The substrate surface alignment properties also provide a "neutral" isolation volume of liquid crystal material. As has been discussed hereinabove and shown in FIGS. 1 and 3, the bistable configurations of the liquid crystal cells are either mainly horizontal or vertical in orientational director alignment. In order to form a display one needs picture elements (PELs) which are "islands" of bistable cells, which islands are separated from each other. The volume of liquid crystal material that surrounds the "islands" must have the property that switching of a PEL from a first stable state to the next does not affect either the configuration of the "neutral" isolation region or the state of adjacent PELs. Thus the "neutral" isolation region serves as a buffer between PELs and at the same time, by providing pinning of disclinations, stabilizes PELs.

In accordance with the present invention, a first substrate surface which bounds a "neutral" isolation region is treated so that along the surface boundary between a bistable liquid crystal cell volume and the "neutral" isolation region the orientational directors at the surface on the bistable side form a space angle with respect to the orientational directors on the "neutral" side substantially in the range of 45 degrees to 135 degrees and a second substrate surface is treated so that along the surface boundary there is substantially no discontinuity. This is illustrated in one embodiment in FIG. 9 where $N_I$ denotes a "neutral" isolation region for an ST geometry cell. The surface of top substrate 1 and the surface of bottom substrate 2 have been treated so that there is uniformly tilted orientational director alignment in the $N_I$ "neutral" isolation regions. (V denotes an equilibrium state in the vertical configuration and H denotes an equilibrium state in the horizontal configuration.) Note that at cell-"neutral" isolation region boundaries 331–334 at the surface of top substrate 1 there is an alignment discontinuity with a space angle between alignments on either side of the boundary in the range of 45 degrees to 135 degrees. Also note that there is no discontinuity at boundaries along the surface of bottom substrate 2.

Figure 2:
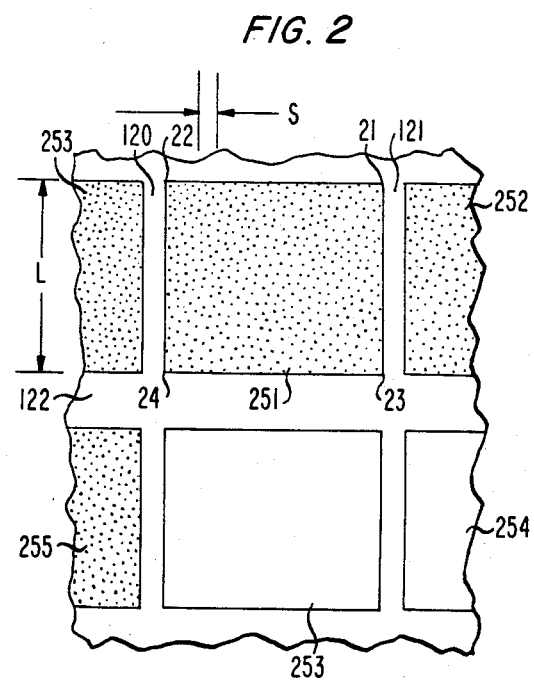
FIG. 2 shows a portion of a liquid crystal display having a square array of PELS 251-255, each PEL being a picture element comprising an isolated ST geometry cell. Each PEL in the array is isolated from the others by a "neutral" isolation region, e.g. 120, 121, and 122.

FIG. 2 shows a top view of a section of a display made up of picture elements (PELs) 251–255, each PEL comprising an isolated ST geometry cell. PELs 251–253, and 255 are in one equilibrium state and PEL 253–254 are in the other. The PELs are separated by a "neutral" isolation region of liquid crystal material 120, 121, and 122. The observer's eye is above the top substrate, e.g. substrate 1 in FIG. 1, and light is incident upon the display from below the bottom substrate, e.g. substrate 2 in FIG. 1. In this embodiment, each PEL had a linear array of interdigital electrodes (IDE) 10 μm wide at a 50 μm spacing. The PELs were 1 mm long. Cyanobiphenyl samples (E7 from Merck Chemical Company) doped with up to 2 percent of a pleochroic dye were placed between substrates and the PELs had a substrate surface to substrate surface thickness of approximately 25 μm.

A polarizer having its polarization direction oriented along the line between points 23 and 24 in FIG. 2 is placed below the bottom substrate, e.g., substrate 2 in FIG. 1, in order to polarize the light prior to its passage through the display. PEL 251 is shown to reside in the horizontal state and the pleochroic molecules are therefore aligned in like manner as are the cigar-shaped bodies shown in state 100 of FIG. 1, which alignment provides maximum absorption. When the light passes through PEL 251 there is much absorption and the PEL takes on the color of the dye, e.g. blue.

PEL 253 is shown to reside in the vertical state and the pleochroic molecules are therefore aligned in like manner as are the cigar-shaped bodies shown in state 101 of FIG. 1, which alignment provides minimum absorption. When the light passes through PEL 253 it takes on the color of the incident radiation, e.g., white. (Note that the particular "neutral" isolation region shown in FIG. 2 is nonabsorbing and appears white. This will be discussed in further detail below).

Switching between the equilibrium states of a PEL in the display shown in FIG. 2 occurs by inducing the relocation of disclinations within the liquid crystal material. As described hereinabove PEL 251 is an ST geometry cell with electrodes such as 110–113 in FIG. 1, which electrodes are parallel to the line between points 21 and 23 in FIG. 2. "Neutral" isolation regions 120–122 assure disclination pinning along the lateral boundaries of PEL 251, i.e. along the lines between points 21 and 23 and between points 22 and 24, which lateral boundaries are parallel to the electrodes and also along the terminal boundaries of PEL 251, i.e., along the lines between points 21 and 22 and between points 23 and 24, which terminal boundaries are perpendicular to the electrodes.

Figure 9:
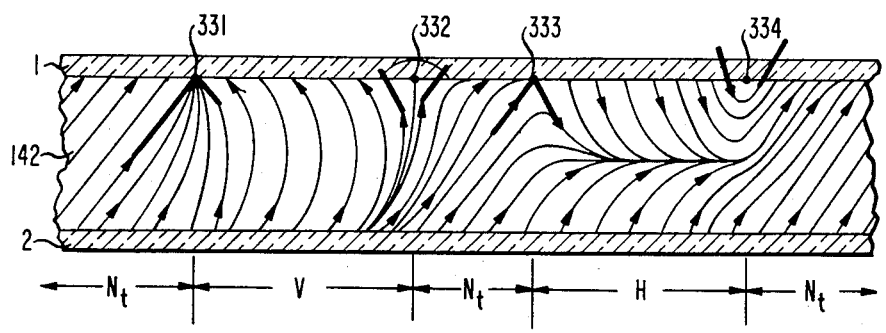

According to one embodiment of the present invention, a uniformly tilted liquid crystal material, as shown by $N_t$ in FIG. 9, is disposed in "neutral" isolation regions 120, 121 and 122. This results in stable horizontal and vertical states in the PELs, due to strong pinning of $S = \pm \frac{1}{2}$ disclinations at the interfaces between the "neutral" isolation region and the PELs. Note that a "neutral" isolation region comprising a uniformly tilted liquid crystal orientational director alignment forms an isolation scheme for ST PELs as well as for AT PELs.

Appendix A contains an analysis of various schemes for "neutral" region alignment and shows that the alignment shown in FIG. 9 achieves stability. As seen from the analysis performed in Appendix A, the crucial aspect of the present invention is the provision of a discontinuity in the orientational director alignment at the PEL-"neutral" isolation region boundary on one substrate surface and the provision of substantially no discontinuity at the boundary on the other substrate. Furthermore, the discontinuity must be such that the space angle (the angle between two vectors) between the orientational director alignment on the PEL side of the boundary and the orientational director alignment on the "neutral" isolation region side of the boundary has a value substantially in the range of 45 to 135 degrees. This requirement can be achieved even when the orientational director alignment twists from the one substrate having the discontinuity to the other. This last result is advantageous in that it eases the tolerances required for device fabrication. However, in order to maintain the desired background to feature contrast the twisting of the directors in the "neutral"0 isolation region should be gentle enough to allow the light to follow the Mauguin "waveguide" limit.

Accordingly, an appropriate embodiment can have a uniformly tilted "neutral" isolation region, substantially all of which directors are disposed in a plane which forms an angle with respect to the plane of the equilibrium states, as long as the appropriate space angle condition is achieved. The effect of having a discontinuity at only substrate surface is to make the "neutral" isolation state monostable, i.e., have only one state. This ensures that as the PEL is switched from one equilibrium state to the other the "neutral" isolation region is not altered.

One embodiment of the present invention uses a blue pleochroic dye to provide either blue-on-white displays or white-on-blue displays. These displays are fabricated by using a uniformly tilted "neutral" isolation region and disposing the tilt plane either perpendicular to or parallel to the symmetry plane of the equilibrium states of the PEL. (The symmetry plane for a non-twist bistable cell is the plane in which there is no director twist). This is illustrated in FIGS. 10 and 11.

Figure 10:
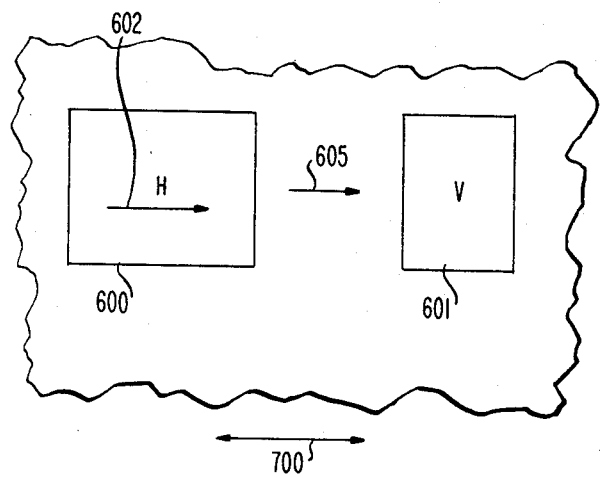
FIGS. 10–11 show embodiments of the present invention for white-on-dark background and dark-on-white background displays respectively.

In FIG. 10 PEL 600, in the horizontal state, and PEL 601, in the vertical state, are surrounded by a "neutral" isolation region having a uniform tilt in a plane parallel to the direction shown by arrow 605 and a line perpendicular to the plane of the paper. Note that arrow 605 is parallel to the symmetry plane of the horizontal state, which symmetry plane is parallel to the direction shown by arrow 602 and a line perpendicular to the plane of the paper. A polarizer having a polarization direction along arrow 700 is disposed below the display. In FIG. 10 the horizontal state will appear blue, as will the "neutral" isolation region due to absorption of the light by the pleochroic dye. The vertical state will therefore appear to be white on a blue background.

Figure 11:
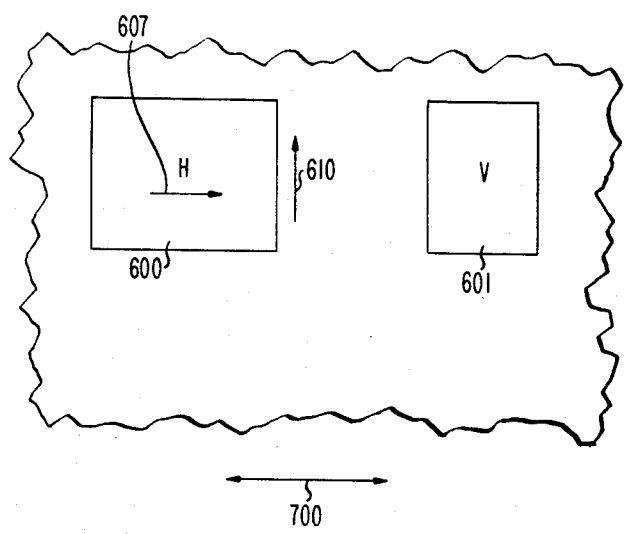

In FIG. 11 PEL 600, in the horizontal state, and PEL 601, in the vertical state, are surrounded by a "neutral" isolation region having a uniform tilt along in a plane parallel to the direction shown by arrow 610 and a line perpendicular to the plane of the paper. Note that arrow 610 is perpendicular to the symmetry plane of the horizontal state, which symmetry plane is parallel to the direction shown by arrow 607 and a line perpendicular to the plane of the paper. Now when light impinges upon the cell after traversing a polarizer having a polarization direction along arrow 700, the horizontal state will appear blue but the "neutral" isolation region will appear white. The vertical state will also appear white. Thus the embodiment shown in FIG. 10 will produce white-on-blue (or dark) and the embodiment shown in FIG. 11 will produce blue (or dark)-on-white.

ST and AT matrix arrays of PELs with lengths equal to 0.5 and 1 mm, each with its own $In_2O_3$ interdigital electrode have been built. The "neutral" isolation region, as described hereinabove, as well as the PELs were produced by the oblique deposition of oxides such as $TiO_2$ or $SiO_x$. The isolation region is first defined by uniform oblique deposition and is followed by definition of the active PEL regions by a second oblique deposition from the opposite direction. Note that the oblique depositions that define the substrate surface alignments may, but need not, overlap, with the later deposit defining the direction of alignment in a specific region of the substrate. This makes the fabrication process simpler in that tolerances need not be held to extremely high values.

APPENDIX A

Analysis of the Stabilizing Properties of a "Neutral" Isolation Region

Figure 8:
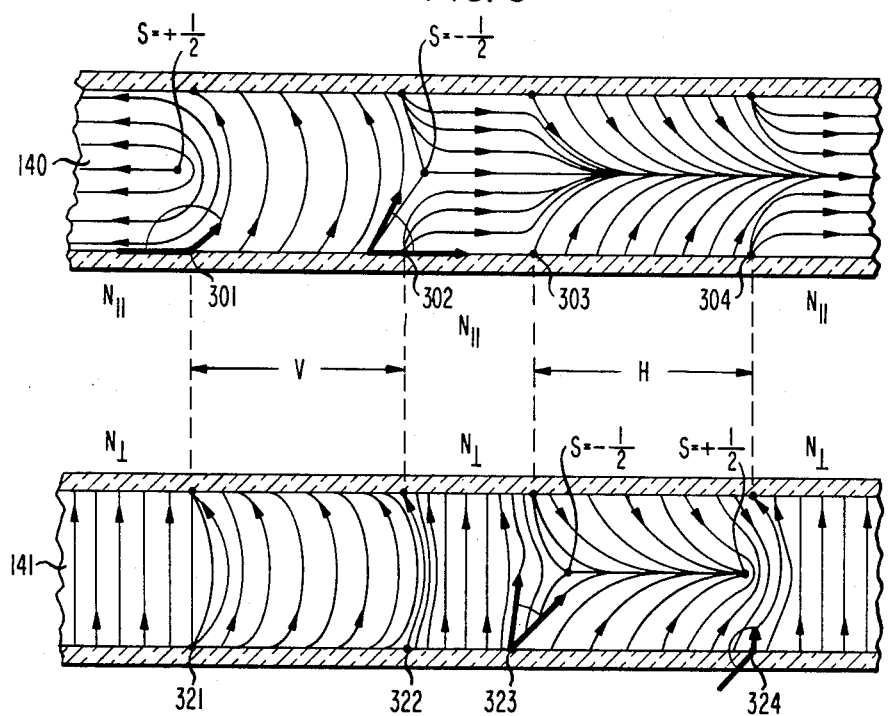
FIGS. 8–9 show horizontal and vertical cells in the ST geometry isolated by various types of "neutral" isolation regions.

The following analyzes the stabilizing properties of several different "neutral" isolation region surface alignment specifications. The analysis is shown for the PEL - "neutral" isolation region boundary along the line between point 21 and 23 and along the line between points 22 and 24 of FIG. 2. FIGS. 8 and 9 depict ST geometry displays having alternating cells in horizontal and vertical equilibrium states (denoted as V and H in FIGS. 8 and 9). The alternating cells are separated by three types of "neutral" isolation regions. The "neutral" isolations regions are defined by the director alignments therein as $N_{//}$ for a uniformly parallel alignment, $N_{195}$ for a uniformly perpendicular alignment, and $N_t$ for a uniformly tilted alignment, respectively. Note that an equilibrium state of a PEL is stable only if the disclinations that define its boundaries with the "neutral" isolation region are pinned thereto. (The material contained in Appendix B discuss the orientational director alignment discontinuity required to pin a disclination.)

In display 140 of FIG. 8, the boundaries between the $N_{//}$ "neutral" isolation regions on either side of the horizontal state cell at points 303 and 304 do not have disclinations, whereas the boundaries between the $N_{//}$ "neutral" isolation regions on either side of the vertical state cell at points 301 and 302 have $S = \pm \frac{1}{2}$ disclinations. For a surface alignment angle $\Phi_0 \cong 45$ degrees the space angle between alignments at point 301 exceeds 135 degrees while the space angle between alignments at point 302 is less than 45 degrees. Thus, the disclinations at points 301 and 302 are repelled or at best marginally attracted to the surface and this leaves the vertical state unstable against drift into the horizontal state along the line between points 21 and 23 of FIG. 2.

Similarly, in display 141 of FIG. 8 the boundaries between the $N_\perp$ "neutral" isolation regions on either side of the vertical state cell at points 321 and 322 do not have disclinations, whereas the boundaries between the $N_\perp$ "neutral" isolation regions on either side of the horizontal state cell at points 323 and 324 have $S = \pm \frac{1}{2}$ disclinations. For a surface alignment angle $\Phi_0 \cong 45$ degrees the space angle between alignments at points 323 and 324 are just barely at the limit for attraction. Thus the disclinations are not pinned strongly and the horizontal state is unstable.

In display cell 142 of FIG. 9, the boundaries between the $N_t$ "neutral" isolation regions and the horizontal and the vertical state cells at points 331-334 contain $S = \pm \frac{1}{2}$ disclinations. Furthermore, each boundary contains an approximately 90 degree discontinuity at one substrate surface and no discontinuity at the other. Thus the disclinations are strongly repelled by one surface and attracted by the other, resulting in strong pinning and completely stable horizontal and vertical states. Thus a uniformly tilted neutral region form an appropriate isolation scheme for ST geometry PELs.

While the above analysis was carried out for boundaries of the type along the line between points 21 and 23 of FIG. 2, the extension to boundaries of the type between points 21 and 22 of FIG. 2 as well as to AT geometry PELs is quite direct.

APPENDIX B

Pinning of Disclinations at Discontinuities

The pinning of bulk disclinations at a substrate surface requires a discontinuity in nematic orientational director alignment at the surface to provide an attractive interaction having sufficient strength to overcome the repulsive interaction between the bulk disclination and a uniform orientational director alignment. (The repulsion arises from the fact that the image of a disclination of strength S above a surface having uniform director alignment at angle $\Phi_0$ is a disclination of similar sign.) An alignment discontinuity at a surface may be either the convergent type, i.e. type A, having directors on either side of the discontinuity tilt towards each other, or the divergent type, i.e. type B, having directors on either side of the discontinuity tilt away from each other.

Figure 3:
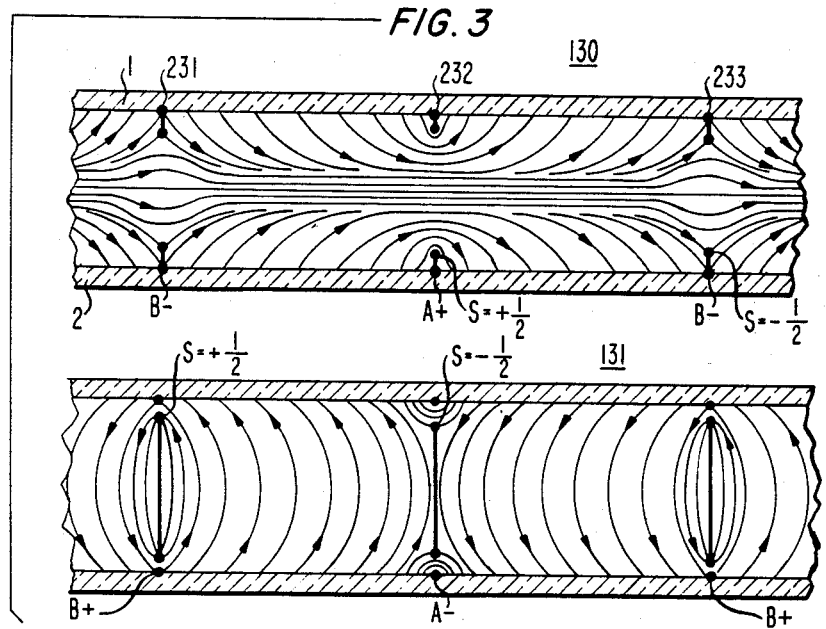
FIG. 3 shows the equilibrium states of a portion of a cell in the AT geometry, i.e. substantially horizontal state 130 and substantially vertical state 131.

FIG. 3 shows a portion of horizontal state cell 130 and a portion of vertical state cell 131 in the AT geometry. Surface alignment discontinuities of the convergent type, type A, and divergent type, type B, are shown with $S = \pm \frac{1}{2}$ bulk disclinations nearby. As shown in FIG. 3, each surface alignment discontinuity type may assume the character of a positive or negative strength disclination; therefore both type A and type B surface alignment discontinuities are capable of providing an attractive interaction for a bulk singularity of either sign.

The size of the surface alignment discontinuity is critical for determining if pinning exists or not. As illustrated below, model calculations show that strength $\frac{1}{2}$ bulk disclinations are attracted to type A or type B tilt-reversal surface alignment discontinuities when $\Phi_0$ either exceeds $\pi/8$ or is less than $3\pi/8$, or equivalently when the space angle $\beta$ between the director tilt alignments on either side of the surface discontinuity lies between $\pi/4$ and $3\pi/4$. In one respect these results can establish the criterion for bistability of the AT geometry shown in FIG. 3. That is, bistability occurs if $\Phi_0$ lies between 22.5 degrees and 67.5 degrees. (A smaller value of $\Phi_0$ renders $A_-$ and $B_+$ repulsive to disclinations, and thereby makes the vertical state unstable; while a larger value of $\Phi_0$ renders $A_+$ and $B_-$ repulsive to disclinations, and thereby makes the horizontal state unstable.)

Figure 4:
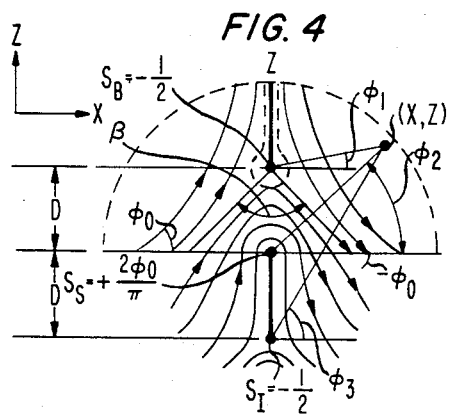
FIGS. 4–7 show four types of orientational director alignment discontinuity at a surface.

The following is a model calculation for the pinning of strength $\frac{1}{2}$ bulk disclinations at tilt-reversal surface alignment discontinuities. FIG. 4 shows an $S = -\frac{1}{2}$ disclination in the vicinity of a type $A_-$ surface discontinuity, at which surface discontinuity the director alignment, i.e. tilt, changes from $-\Phi_0$ to $+\Phi_0$. The equilibrium configuration $\Phi(x,z)$, where $\Phi$ denotes the director orientation with respect to the x-axis, satisfies Laplace's equation for equal elastic constants $(\overline{k})$. $\Phi$ may be derived from a superposition of the contributions from the bulk disclination $S_B$, its image $S_I$ at a distance D behind the surface which equals the distance of $S_B$ in front of the surface, and the surface disclination $S_S = +2\Phi_0/\pi$, where $S_S$ is determined by the size of the discontinuity. For a single isolated disclination $S_B$, the solution to Laplace's equation is $\Phi(x,z) = S_B \theta(x,z)$, where $\theta$ is the angular displacement of $(x,z)$ from the x-axis. Superposition yields:

$$\Phi(x,z) = -\tfrac{1}{2}(\theta_1 + \theta_3) + S_S \theta_2 - \Phi_0. \tag{B1}$$

The energy of the configuration is:

$$f = (\overline{k}/2) \int (\nabla\Phi)^2 dx dz = (\overline{k}/2) \int \Phi \nabla\Phi \cdot \overline{dl} \tag{B2}$$

where $\overline{dl}$ is a closed contour surrounding the nematic liquid crystal cell volume, except for a branch cut through the disclination $S_B$. The integral derives finite contributions from the two surface segments and the branch cut. By expressing the three $\theta$'s in terms of x, z and D and using the fact that $\Phi$ is constant along each of the three contributing segments, equation B2 yields:

$$f(D) = 2\overline{k}\left(\Phi_0 - \frac{\pi}{8}\right) \ln \frac{D}{a} + \text{other terms.} \tag{B3}$$

where a is the core radius of the disclination.

From equation B3 we see that $f \to \infty$ as $D \to \infty$, and $f \to -\infty$ as $D \to 0$ (when $\Phi_0 > \pi/8$). The energy is therefore minimized by having $D \to 0$; in other words the disclination is attracted to the surface discontinuity. It is clear that the interaction becomes repulsive when $\Phi_0 < \pi/8$. Thus $\pi/8$ represents a critical angle for the attraction of $S_B$ to the surface discontinuity.

Figure 5:
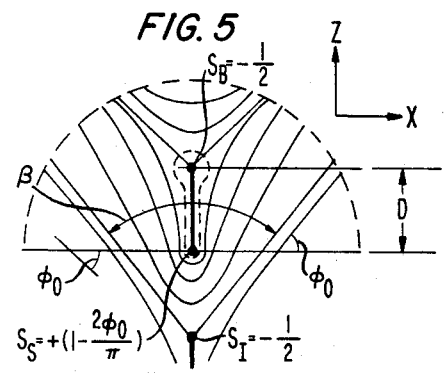
Figure 6:
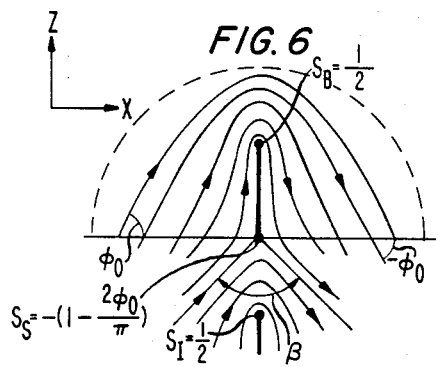
Figure 7:
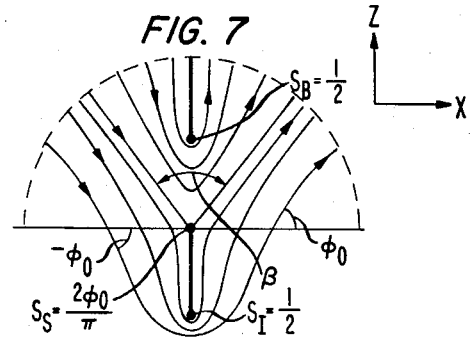

Similar analyses for the cases shown in FIGS. 5–7 yield analogous results, with the resulting $S_S$ of the surface discontinuity, the energy f(D), and the condition for attraction indicated in the figures.

For the $B_-$ discontinuity of FIG. 5 we have:

$$f(D) = -2\bar{k}\left(\Phi_0 - \frac{3\pi}{8}\right) \ln \frac{D}{a}. \quad \text{(B4)}$$

For the $A_+$ discontinuity of FIG. 6 we have:

$$f(D) = -2\bar{k}\left(\Phi_0 - \frac{3\pi}{8}\right) \ln \frac{D}{a}. \quad \text{(B5)}$$

For the $B_+$ discontinuity of FIG. 7 we have:

$$f(D) = 2\bar{k}\left(\Phi_0 - \frac{\pi}{8}\right) \ln \frac{D}{a}. \quad \text{(B6)}$$

Thus bulk disclinations are attracted to type A or type B surface discontinuities when $\Phi_0$ either exceeds $\pi/8$ or is less than $3\pi/8$; or equivalently, when the space angle $\beta$ spanned by the director alignment on either side of discontinuity lies between $\pi/4$ and $3\pi/4$. (Note that the above discussion also applies to the ST geometry.)

What is claimed is:

1. A liquid crystal cell comprising a liquid crystal material having orientational directors disposed between a first substrate surface of a first substrate and a second substrate surface of a second substrate, said liquid crystal material being mainly in the nematic mesophase, and said substrate surfaces being treated so that said orientational directors are aligned in predetermined patterns at said substrate surfaces, which patterns provided substantially bistable volumes in said liquid crystal material;

characterized in that:
at least two of said substantially bistable volumes are separated by a neutral isolation region, said first substrate surface is treated so that, along a portion of the boundary between one of said at least two substantially bistable volumes and said neutral isolation region, the space angle between the orientational director alignments on one side of the boundary and the orientational director alignments on the other side of the boundary has a value substantially in the range of 45 degrees to 135 degrees; and said second substrate surface is treated so that, along a portion of the boundary between said one of said at least two substantially bistable volumes and said neutral isolation region, there is substantially no discontinuity in orientational director alignment.

2. A liquid crystal cell in accordance with claim 1 wherein the orientational directors in said neutral isolation region are substantially parallel to a first plane.

3. A liquid crystal cell in accordance with claim 2 wherein the orientational directors in said neutral isolation region are aligned at substantially the same angle relative to said first or said second substrate.

4. A liquid crystal cell in accordance with claim 3 wherein the orientational directors in at least one of said two bistable volumes are substantially parallel to a second plane.

5. A liquid crystal cell in accordance with claim 4 wherein said first plane is substantially parallel to said second plane.

6. A liquid crystal cell in accordance with claim 4 wherein said first plane is substantially perpendicular to said second plane.

* * * * *